(12) United States Patent
Qtaishat et al.

(10) Patent No.: US 9,919,275 B2
(45) Date of Patent: Mar. 20, 2018

(54) TECHNIQUES FOR PREPARING MULTI-LAYER POLYMERIC AND MIXED MATRIX MEMBRANES AND A DEVICE FOR MEMBRANE DISTILLATION

(71) Applicant: MEMBRANE DISTILLATION DESALINATION LTD. CO., Amman (JO)

(72) Inventors: Mohammed Rasool Qtaishat, Amman (JO); Saad Almuttiri, Jeddah (SA)

(73) Assignee: MEMBRANE DISTILLATION DESALINATION LTD. CO., Amman (JO)

(*) Notice: Subject to any disclaimer, the term of this patent is extended or adjusted under 35 U.S.C. 154(b) by 0 days.

(21) Appl. No.: 14/761,780

(22) PCT Filed: Jan. 17, 2014

(86) PCT No.: PCT/IB2014/058356
§ 371 (c)(1),
(2) Date: Jul. 17, 2015

(87) PCT Pub. No.: WO2014/111889
PCT Pub. Date: Jul. 24, 2014

(65) Prior Publication Data
US 2015/0360184 A1    Dec. 17, 2015

Related U.S. Application Data

(60) Provisional application No. 61/753,751, filed on Jan. 17, 2013.

(51) Int. Cl.
*B01D 39/00* (2006.01)
*B01D 39/14* (2006.01)
(Continued)

(52) U.S. Cl.
CPC .......... *B01D 71/68* (2013.01); *B01D 61/364* (2013.01); *B01D 63/081* (2013.01);
(Continued)

(58) Field of Classification Search
CPC .................. B01D 71/68; B01D 2325/38; B01D 67/0011; B01D 69/06; B01D 69/08;
(Continued)

(56) References Cited

U.S. PATENT DOCUMENTS 3,398,091 A * 8/1968 Greatorex .............. B01D 53/22
159/1.1
5,468,388 A * 11/1995 Goddard .............. B01D 36/001
210/321.6
(Continued)

FOREIGN PATENT DOCUMENTS

CA    2825547 A1    8/2012
EP    2545983 A1    1/2013
(Continued)

OTHER PUBLICATIONS

International Preliminary Report on Patentability and Written Opinion, dated Jul. 21, 2015 in correspond to International Application No. PCT/IB2014/058356, 12 pages.
(Continued)

*Primary Examiner* — Ana Fortuna
(74) *Attorney, Agent, or Firm* — Sughrue Mion, PLLC

(57) ABSTRACT

Provided is a method of manufacturing a multilayer mixed matrix membrane which includes providing a support layer, casting a hydrophilic layer on a surface of the support layer, casting a hydrophobic layer on the hydrophilic layer, and allowing the layers to form a multilayer mixed matrix membrane. Also provided is a method of manufacturing a hollow fiber composite matrix membrane which includes providing a first solution having a hydrophilic polymer,
(Continued)

providing a second solution having a hydrophobic polymer, and extruding the first and second solutions to form a multilayer hollow fiber composite matrix membrane. Additionally, a plate-and-frame membrane module for direct contact membrane distillation using a multilayer mixed matrix membrane is provided. The plate-and-frame membrane module includes a feed inlet capable of distributing process solution throughout the membrane module, a permeate inlet capable of distributing process solution throughout the membrane module, a tortuous promoter comprising multiple flow channels, a feed outlet, and a permeate outlet.

14 Claims, 11 Drawing Sheets

(51) Int. Cl.
| | | |
|---|---|---|
| B01D 29/46 | (2006.01) | |
| B01D 47/00 | (2006.01) | |
| B28B 3/20 | (2006.01) | |
| B01D 67/00 | (2006.01) | |
| B01D 71/68 | (2006.01) | |
| B01D 61/36 | (2006.01) | |
| B01D 69/06 | (2006.01) | |
| B01D 69/08 | (2006.01) | |
| B01D 69/12 | (2006.01) | |
| B01D 69/14 | (2006.01) | |
| B01D 71/16 | (2006.01) | |
| B01D 71/34 | (2006.01) | |
| B01D 71/36 | (2006.01) | |
| B01D 71/56 | (2006.01) | |
| B01D 63/08 | (2006.01) | |
| B01D 69/02 | (2006.01) | |
| B01D 71/02 | (2006.01) | |
| B01D 71/54 | (2006.01) | |
| B01D 71/64 | (2006.01) | |
| B29C 39/00 | (2006.01) | |
| B29C 39/12 | (2006.01) | |
| B29C 47/00 | (2006.01) | |
| B29C 47/06 | (2006.01) | |
| C02F 1/44 | (2006.01) | |
| B01D 71/26 | (2006.01) | |
| B29L 9/00 | (2006.01) | |
| C02F 101/10 | (2006.01) | |
| C02F 103/08 | (2006.01) | |

(52) U.S. Cl.
CPC ....... *B01D 63/082* (2013.01); *B01D 67/0079* (2013.01); *B01D 69/02* (2013.01); *B01D 69/06* (2013.01); *B01D 69/08* (2013.01); *B01D 69/12* (2013.01); *B01D 69/148* (2013.01); *B01D 71/02* (2013.01); *B01D 71/022* (2013.01); *B01D 71/024* (2013.01); *B01D 71/16* (2013.01); *B01D 71/34* (2013.01); *B01D 71/36* (2013.01); *B01D 71/54* (2013.01); *B01D 71/56* (2013.01); *B01D 71/64* (2013.01); *B29C 39/003* (2013.01); *B29C 39/123* (2013.01); *B29C 47/0004* (2013.01); *B29C 47/065* (2013.01); *C02F 1/447* (2013.01); *B01D 69/088* (2013.01); *B01D 71/26* (2013.01); *B01D 2325/36* (2013.01); *B01D 2325/38* (2013.01); *B29L 2009/00* (2013.01); *C02F 2101/10* (2013.01); *C02F 2103/08* (2013.01); *C02F 2201/002* (2013.01)

(58) Field of Classification Search
CPC ........ B01D 69/10; B01D 69/12; B01D 71/26; B01D 71/58
See application file for complete search history.

(56) References Cited

U.S. PATENT DOCUMENTS

| | | | | |
|---|---|---|---|---|
| 7,135,114 | B2 * | 11/2006 | Nonninger | B01D 29/39 210/312 |
| 9,314,743 | B2 * | 4/2016 | Kloos | B01D 61/12 |
| 2003/0209485 | A1 | 11/2003 | Kools | |
| 2003/0217965 | A1 * | 11/2003 | Kools | B01D 67/0009 210/500.1 |
| 2006/0144788 | A1 | 7/2006 | Cath et al. | |
| 2008/0004205 | A1 * | 1/2008 | Tkacik | B01D 61/145 210/500.21 |
| 2011/0114559 | A1 * | 5/2011 | Fislage | B01D 53/22 210/648 |
| 2014/0158610 | A1 * | 6/2014 | Qtaishat | B01D 61/364 210/490 |
| 2015/0380749 | A1 * | 12/2015 | Fasold | H01M 8/04149 429/413 |

FOREIGN PATENT DOCUMENTS

| | | | | |
|---|---|---|---|---|
| EP | 2 604 330 | * | 6/2013 | ............ B01D 67/00 |
| JP | S6219205 A | | 1/1987 | |
| WO | 2012100326 A1 | | 8/2012 | |

OTHER PUBLICATIONS

Bonyadi et al: "Flux enhancement in membrane distillation by fabrication of dual layer hydrophilic-hydrophobic hollow fiber membranes", Journal of Membrane Science. Elsevier Scientific Publ.Company. Amsterdam. NL. vol. 306, No. 1-2, Nov. 7, 2007 (Nov. 7, 2007). pp. 134-146, XP022335825. ISSN: 0376-7388, DOI: 10.1016/J.MEMSCI.2007.08.034.

Felinia Edwie et al: "Effects of additives on dual-layer hydrophobic hydrophilic PVDF hollow fiber membranes for membrane distillation and continuous performance", Chemical Engineering Science, Oxford, GB, vol. 68, No. 1, Oct. 10, 2011 (Oct. 10, 2011), pp. 567-578, XP028107825, ISSN: 0009-2509, DOI: 10.1016/J.CES. 2011.10.024 [retrieved on Oct. 14, 2011].

* cited by examiner (a)

(b)    M2 Membrane

TECHNIQUES FOR PREPARING MULTI-LAYER POLYMERIC AND MIXED MATRIX MEMBRANES AND A DEVICE FOR MEMBRANE DISTILLATION

RELATED APPLICATIONS

This application claims priority from U.S. Provisional Application No. 61/753,751 filed on Jan. 17, 2013, the disclosure of which is incorporated herein by reference in its entirety.

FIELD

One or more non-limiting embodiments relate to the field of membranes and membrane module for membrane distillation. More particularly, one or more non-limiting embodiments relate to the field of manufacturing flat-sheet and hollow-fibre multilayer composite hydrophobic/hydrophilic polymeric and mixed matrix membranes as well as plate-and-frame membrane module for membrane distillation.

DESCRIPTION OF THE RELATED ART

The following references are discussed in this disclosure and are incorporated herein by reference in their entirety:

Khayet, M., Membranes and theoretical modeling of membrane distillation: A review, Advances in Colloid and Interface Science, 164, 56-88, 2011.

Qtaishat, M. R., Matsuura, T, Khayet M., Design of Novel Membranes for Membrane Distillation and Related Methods of Manufacture, WO 2012/100318, 2012a.

Qtaishat, M. R., Matsuura, T., Khayet M., Al-Muttiri S., Composite Mixed Matrix Membranes for Membrane Distillation and Related Methods of Manufacture, WO 2012/100326, 2012b.

Membrane distillation (MD) is an emerging separation technology, which is being investigated worldwide as a low cost and energy saving alternative to conventional separation processes such as distillation, pervaporation and reverse osmosis. MD is a thermally driven process in which a microporous membrane acts as a physical support separating a warm solution from a cooler chamber containing either a liquid or a gas. As the process is non-isothermal, vapour molecules migrate through the membrane pores from the warm (feed) side to the cold (permeate) side. This can be achieved using different membrane distillation configurations, that are: i) direct contact membrane distillation, DCMD; ii) air gap membrane distillation; AGMD; iii) sweeping gas membrane distillation, SGMD and iv) vacuum membrane distillation, VMD (Khayet, 2011).

The main requirement of the MD membrane is that the pores must not be wetted and only vapour and/or gas is present. This is limiting the membrane distillation membranes choice into those made of hydrophobic materials such as polytetrafluoroethylene (PTFE), polypropylene (PP), and polyvinylidene fluoride (PVDF). Although these membranes were manufactured for microfiltration and ultrafiltration purposes, but they have been used in MD research due to their hydrophobic nature (Khayet, 2011).

MD holds several advantages compared to other separation processes. These advantages, mainly, are: up to 100% rejection of non-volatile solutes, lower operating temperatures than conventional distillation, lower operating pressures than conventional pressure-driven membrane separation processes such as reverse osmosis (RO) and reduced vapour spaces compared to conventional distillation processes. Despite all these advantages, MD process has not been commercialized yet for large scale plants. One of the reasons is the relatively lower MD flux and the membrane wetting, which diminishes the durability of MD membranes. In other words, those are results of the inadequate design of the MD membranes and modules.

In our latest patents (Qtaishat et al. 2012a,b), the requirements of higher permeate flux MD membranes were clearly identified. As a result, the concepts of hydrophobic/hydrophilic composite polymeric and mixed matrix membranes for MD were firstly presented. It was shown that these types of membranes satisfy all the requirements of higher permeate flux MD membranes (Qtaishat et al. 2012a,b). The membranes of these patents were prepared by phase inversion method in a single casting step. For the polymeric membranes; a hydrophilic base polymer was blended with hydrophobic surface modifying macromolecules (SMMs) (Qtaishat et al. 2012a), however in case of mixed matrix membranes, inorganic nanoparticles of high thermal conductivity was added to the polymeric dope solution (Qtaishat et al. 2012b). In the latter patent, the evaporation volume of the cast film was controlled in order to allow sufficient time for: 1) SMM migration to the top surface (air/polymer interface) and 2) nanoparticles settling in the bottom layer of the cast film.

In non-limiting embodiments disclosed herein, novel techniques of preparing flat-sheet and hollow-fibre composite multilayer polymeric and mixed matrix membranes are provided, it is believed that these new technique will allow more control on the produced membranes layers characteristics for both flat-sheet and hollow-fibre membranes. Moreover, they offer flexibility to scale up for mass production of the membranes.

It must be mentioned that the membrane module plays a key role in improving the permeate flux, more specifically, in our earlier patents (Qtaishat et al. 2012a,b) it was stated that the composite membranes performance improvement as a result of increasing the thermal conductivity of the bottom hydrophilic layer is realized when the boundary layers resistances are diminished. There remains a need for improving the membrane preparation technique and the membrane module design to take MD process another step forward.

SUMMARY

The objects are: 1) to provide novel techniques to prepare both flat-sheet and hollow fibre composite polymeric and mixed matrix membranes for membrane distillation and 2) to provide a membrane module that offers improved flow hydrodynamics of membrane distillation process solutions.

According to an aspect of a non-limiting embodiment, a method of manufacturing a multilayer mixed matrix membrane includes providing a support layer, casting a hydrophilic layer on a surface of the support layer, casting a hydrophobic layer on the hydrophilic layer, and allowing the layers to form a multilayer mixed matrix membrane.

The method may further include immersing said multilayer mixed matrix membrane in water to allow for gelation.

The hydrophobic layer may include a hydrophobic polymer selected from the group consisting of polypropylene, polytetraflouroethylene, and polyvinylidene fluoride.

The hydrophobic layer may further include a fluorinated hydrophobic surface modifying macromolecule selected from a group consisting of poly(urethane propylene glycol), poly(urethane diphenylsulfone), and poly(urea dimethylsiloxane urethane).

The hydrophilic layer may include a hydrophilic polymer selected from the group consisting of polysulfone, polyether sulfone, polyetherimide, polyamide, cellulose acetate, and thermoplastics.

The hydrophilic layer may further include an inorganic nanoparticle having high thermal conductivity selected from the group consisting of copper oxide, boron nitride, aluminum nitride, aluminum, iron, silicon carbide, and a metal.

The hydrophilic layer may further include a non-solvent additive selected from a group consisting of γ-butyrolactone and ethanol.

The method may further include a step of maximizing the porosity of the hydrophobic layer.

The method may further include a step of minimizing the thickness of the hydrophobic layer.

The method may further include a step of maximizing the porosity of the hydrophilic layer.

The method may further include a step of maximizing the thickness of the hydrophilic layer.

The method may further include a step of maximizing the thermal conductivity of the hydrophilic layer.

The method may further include a step of using a hydrophilic polymer dope solution including a host hydrophilic polymer to cast the hydrophilic layer, and a step of using a hydrophobic polymer dope solution including a hydrophobic polymer to cast the hydrophobic layer, wherein the hydrophobic polymer dope solution has a lower viscosity and density than the hydrophilic polymer dope solution on the previously cast hydrophilic film.

According to another aspect of a non-limiting embodiment, a method of manufacturing a hollow fiber composite matrix membrane includes providing a first solution having a hydrophilic polymer, providing a second solution having a hydrophobic polymer, and extruding the first and second solutions to form a multilayer hollow fiber composite matrix membrane.

The first solution may be extruded as an outer layer.

The first solution may be extruded as an inner layer.

The second solution includes a hydrophobic polymer selected from the group consisting of polypropylene, polytetraflouroethylene, and polyvinylidene fluoride.

The second solution may further include a fluorinated hydrophobic surface modifying macromolecule selected from a group consisting of poly(urethane propylene glycol), poly(urethane diphenylsulfone) and poly(urea dimethylsiloxane urethane).

The first solution may include a hydrophilic polymer selected from the group consisting of polysulfone, polyether sulfone, polyetherimide, polyamide, cellulose acetate, and thermoplastics.

The first solution may further include an inorganic nanoparticle having high thermal conductivity selected from the group consisting of copper oxide, boron nitride, aluminum nitride, aluminum, iron, silicon carbide, and a metal.

The first solution may further include a non-solvent additive selected from a group consisting of γ-butyrolactone and ethanol.

The method may further include a step of maximizing the porosity of the hydrophobic layer.

The method may further include a step of minimizing the thickness of the hydrophobic layer.

The method may further include a step of maximizing the porosity of the hydrophilic layer.

The method may further include a step of maximizing the thickness of the hydrophilic layer.

The method may further include a step of maximizing the thermal conductivity of the hydrophilic layer.

The method may further include a step of producing void-free fibres to avoid mechanical weaknesses.

According to another aspect of a non-limiting embodiment, a plate-and-frame membrane module for direct contact membrane distillation using a multilayer mixed matrix membrane is provided, the plate-and-frame membrane module including a feed inlet capable of distributing process solution throughout the membrane module, a permeate inlet capable of distributing process solution throughout the membrane module, a tortuous promoter comprising multiple flow channels, a feed outlet, and a permeate outlet.

The matrix membrane may be configured as a hollow fibre membrane or a flat sheet membrane.

The flow regimes of the feed and permeate flow solutions during direct contact membrane distillation may be a turbulent regime.

The feed and permeate flow channels may be configured such that there is no liquid stagnation in the flow channels.

The membrane module may be configured for direct contact membrane distillation wherein seawater desalination flux is up to 142 kg/m$^2$h.

The membrane module may be configured for direct contact membrane distillation such that it maximizes the Reynolds number.

The membrane module may be configured for direct contact membrane distillation such that it improves flow hydrodynamics.

The membrane module may be configured for direct contact membrane distillation such that it maximizes heat transfer coefficients and minimizes heat and mass transfer resistances in boundary layers.

The membrane module may be configured for direct contact membrane distillation such that it maximizes temperature polarizing coefficient until it reaches unity.

According to another aspect of a non-limiting embodiment, an array including multiple plate-and-frame membrane modules may be provided.

BRIEF DESCRIPTION OF THE DRAWINGS

The above-noted and/or other aspects of the present application will become apparent and more readily appreciated from the following description of the non-limiting embodiments, taken in conjunction with the accompanying drawings in which.

DETAILED DESCRIPTION

Figure 1:
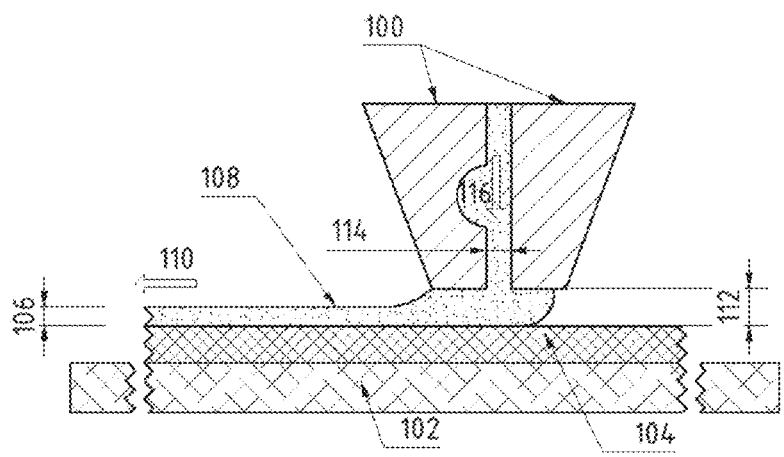
FIG. 1 is a schematic of doctor knife/slot die technique for manufacturing flat-sheet composite multilayer polymeric and mixed matrix membranes according to a non-limiting embodiment.

Unless defined otherwise, all technical and scientific terms used herein have the same meaning as commonly understood by one of ordinary skill in the art to which the non-limiting embodiments belong.

As used in the specification and claims, the singular forms "a", "an" and the "the" include plural references unless the context clearly dictates otherwise. The term "comprising" as used herein will be understood to mean that the list following is non-exhaustive and may or may not include any other additional suitable items, for example one or more further feature(s), component(s) and/or ingredient(s) as appropriate.

MD is a separation process of bright future if the major drawbacks that hindered the process commercialization for decades are overcame. Those are: 1) the relatively lower flux compared to the well-established separation processes and 2) the uncertainty of membrane durability due to the membrane pore wetting phenomenon.

In Qtaishat et al. 2012 a,b, attempts to resolve the MD drawbacks were presented, the membrane was mathematically engineered, which led to introducing the composite hydrophobic/hydrophilic membrane and the mixed matrix membrane concepts. It was experimentally proven that the new membranes contributed to the enhancement of the MD process permeate flux. Moreover, it was theoretically shown that the performance improvement of the newly developed membranes as a result of increasing the hydrophilic thermal conductivity is achievable when the heat transfer coefficients in both feed and permeate boundary layers is as high as possible (up to 50 kW/m²·K), which requires a more sophisticated membrane module design.

In this disclosure, there are provided novel techniques for preparing flat-sheet and hollow-fibre composite polymeric and mixed matrix membranes. Moreover, there is provided a device and sophisticated membrane module design with an improved flow hydrodynamics. The details are as follows The mixed membrane may be configured as a hollow fiber or as a flat sheet.

Novel Techniques to Prepare Flat-Sheet Composite Polymeric and Mixed Matrix Membranes:

The composite membranes of the earlier patents (Qtaishat et al. 2012a,b) were manufactured using the phase inversion method, in a single casting step, in which a host hydrophilic polymer that might include dispersed inorganic nanoparticles blended with the surface modifying macromolecules (SMMs). It must be noted that SMM surface migration is critical to preparation of the membranes of those patents. Actually, when the inorganic nanoparticles is dispersed in the polymeric dope solution, it is desired that they settle down in the cast film opposite to the SMM migration direction, in this case some evaporation time should be allowed in order to overcome the delay caused by the opposite directions of the desired movements of SMMs toward the top layer and the inorganic nanoparticles toward the bottom layer in order to produce the desired characteristics of each membrane layer.

As a matter of fact, this adds enormous difficulty and cost when manufacturing the membranes in large-scale production capacity. In the present disclosure, however, new techniques are presented which overcome the previously mentioned difficulties and eliminate any need for evaporation time.

In accordance with an advantageous embodiment, the techniques comprise preparing two different dope polymer solutions, one of them comprises the hydrophobic polymer and the other comprises the hydrophilic polymer with or without dispersing the nanoparticles, for the top and bottom membrane layers, respectively. As such the dope solution of the top layer has lower viscosity and density than that of the bottom dope solution.

There are two possibilities of the membrane manufacturing as follows

1) Casting the bottom layer dope solution on a non-woven paper using a doctor knife with an adjustable casting thickness, followed by slot die coating of the hydrophobic dope solution on the top of the cast film as shown in FIG. 1), then immersing the coated film in water for gelation. FIG. 1 depicts the slot die (100) applying a coated film (108) directly on a bottom layer (104) which is provided on a flat surface of support (102). The desired characteristics of the membrane are achieved by controlling the dope solutions characteristics and the adjustable parameters shown in FIG. 1), which are: i) the slot die dope solution flow rate (116); ii) the coating speed (110); iii) the coating gab (112) which is the distance between the tip of the slot die (102) and the surface of the bottom layer (104) to which the coated film (108) is applied; iv) the slot die gap (114); and v) the wet thickness (106) which is the thickness of the applied coated film.

Figure 2:
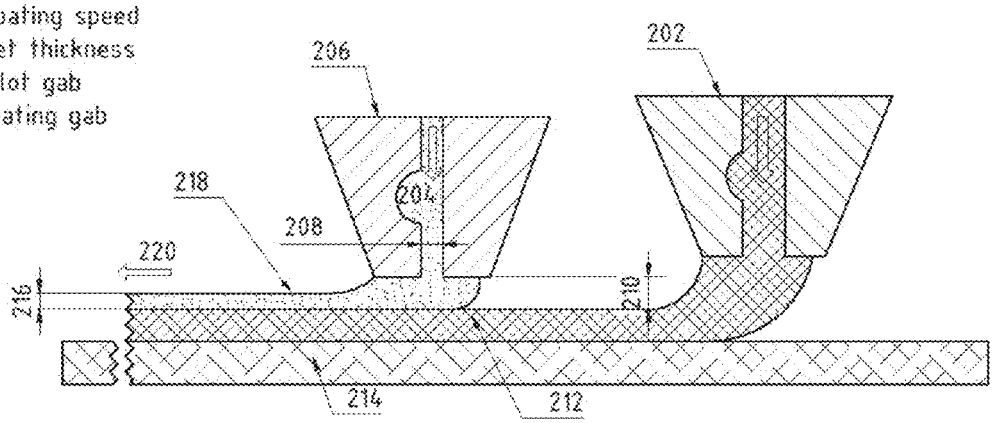
FIG. 2 is a schematic of slot die 1/slot die 2 technique for manufacturing flat-sheet composite multilayer polymeric and mixed matrix membranes according to a non-limiting embodiment.

2) Coating the bottom layer dope solution (212) on a non-woven paper (214) using a slot die (202) with adjustable parameters to control its characteristics, followed by coating the hydrophobic layer (218) on the top of the previously coated film (212) as shown in FIG. 2), then immersing the coated film in water for gelation.

FIG. 2 depicts two slot die assemblies slot die 1 (202) and slot die 2 (206) wherein slot die 1 (202) is configured to apply a bottom layer (212) to a support substrate (214) and wherein slot die 2 (206) is configured to subsequently layer a coated film (218) on top of the bottom layer (212). The desired characteristics of the membrane are achieved by controlling the dope solutions characteristics and the adjustable parameters shown in FIG. 2), which are: i) the slot dies dope solutions flow rates (204); ii) the coating speed of both layers (220); iii) the coating gabs of the slot dies including the slot gab (208) and the coating gap (210); iv) the slot dies gaps (208); and v) the wet thickness (216).

Novel Techniques to Prepare Hollow-fibre Composite Polymeric and Mixed Matrix Membranes:

Nowadays, the hollow-fiber membrane configuration is the most favoured membrane geometry in most membrane separation applications. Preparation of hollow fiber membranes requires both internal and external coagulants for polymer gelation and involves more controlling parameters than those of flat-sheet membranes (i.e. structure and dimensions of the spinneret, viscosity and possibility of spinning of the dope, nature of the internal and external coagulants, flow rate of the bore fluid, dope extrusion rate, length and humidity of the air gap, fiber take-up speed, etc.).

Figure 3:
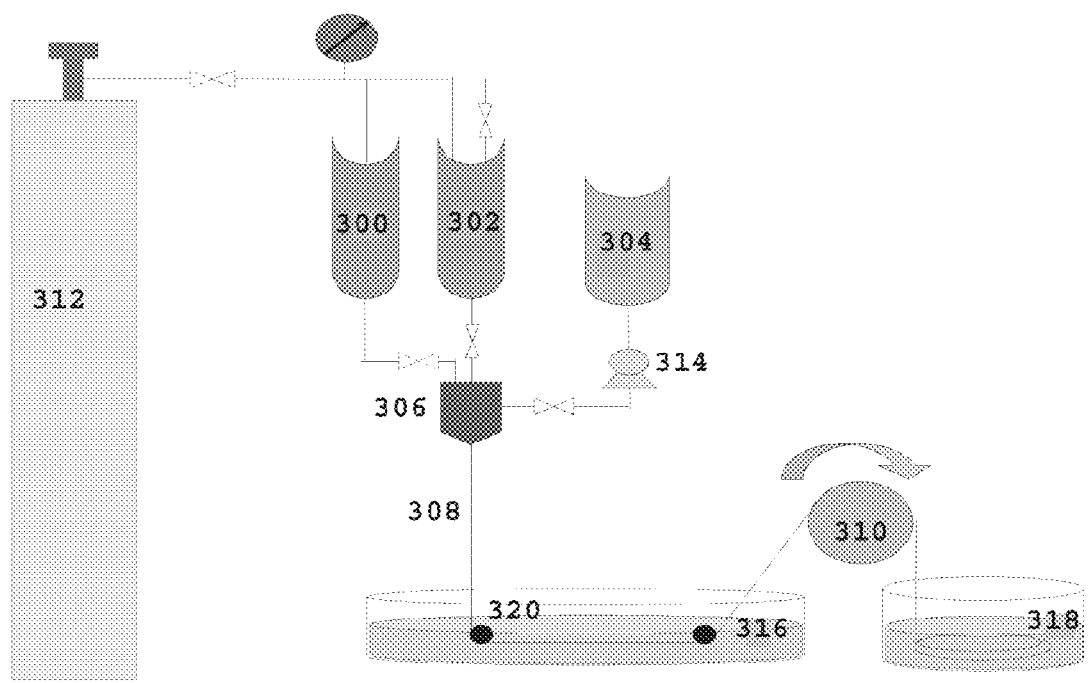
FIG. 3 is a schematic diagram of hollow fiber spinning system according to a non-limiting embodiment.

In accordance with an advantageous embodiment, a novel technique is used in manufacturing hollow-fibre composite multilayer polymeric and mixed matrix membranes. The multilayer comprises a hydrophilic layer, and a hydrophobic layer including a support structure. The technique comprises preparing two different dope polymer solutions, one of them comprises the hydrophobic polymer and the other comprises the hydrophilic polymer with or without dispersing the nanoparticles, for the top and bottom membrane layers, respectively. The multilayer hollow-fiber membranes are prepared in a single step using the two dope solution by dry/wet spinning as shown in FIG. 3). FIG. 3 depicts the preparation of the multilayer hollow-fiber membranes wherein the surface coagulation of the internal surface of the nascent fiber starts immediately after extrusion from the spinneret (306), whereas the external surface experiences coalescence and orientation of polymer aggregates before gelation in the external coagulation medium. The details are as follows: the polymer solutions are loaded into a reservoirs (300, and 302 in FIG. 3) and forced to the spinneret (306) using pressurized nitrogen (312). The extrusion pressure must be maintained constant. The bore fluid contained in the bore liquid vessel (304) can be simultaneously circulated by gravity force or by a bore liquid pump (314). During spinning, attempts must be made to maintain the take up speed nearly the same as the dope extrusion speed. The polymer solutions are then extruded into a coagulation bath (316) placed at a predetermined air gap length (308). After spinning, the nascent fibres are oriented by means of guiding wheels (320) and finally pulled to a collecting reservoir (318) by a wind-up drum (310).

Figure 4:
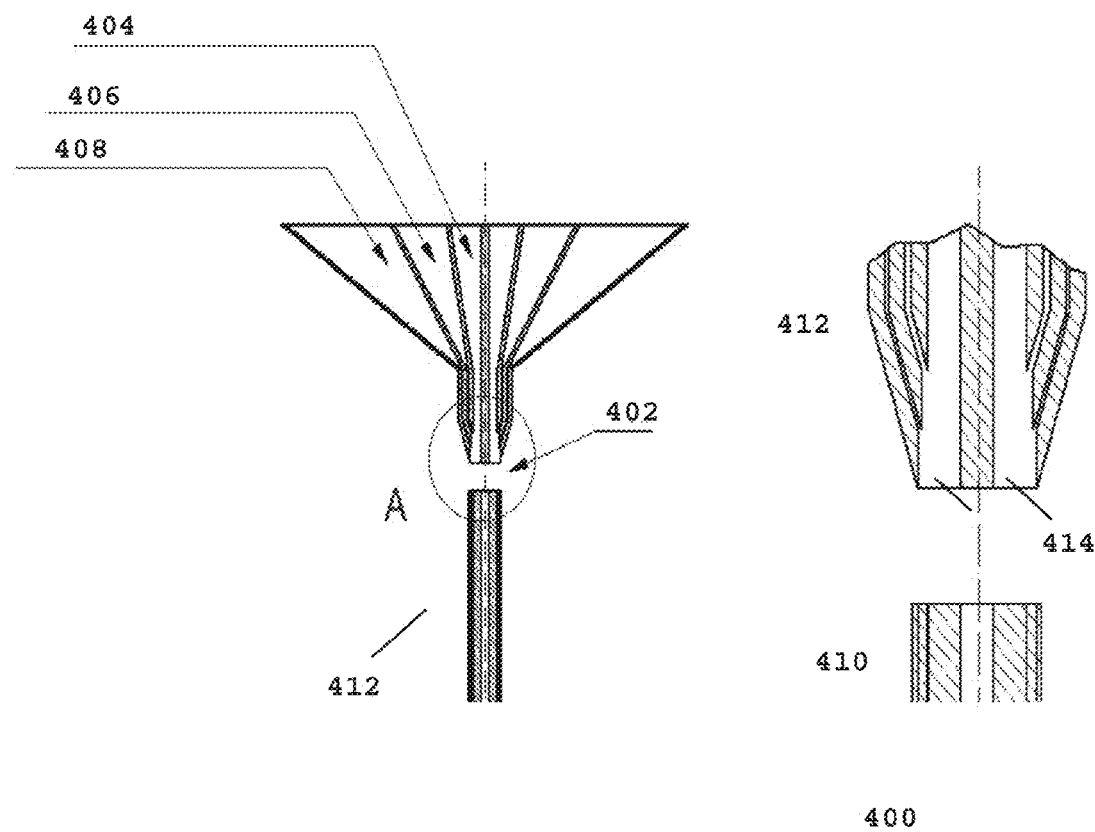
FIG. 4 is a schematic of the spinneret.

In FIG. 4 there is depicted a schematic for a special design for the spinneret that enables the spinning of both dope solutions at once given that the spun fiber internal and external layers are at their desired characteristics by adjusting the process parameters on the mechanical, geometrical and chemical properties of the hollow-fiber membranes. FIG. 4 is a cross section schematic of the spinneret (412) configured wherein an inside layer solution with P>Patm (404), a middle layer solution with P>Patm (406), and an outside layer solution with P>Patm (408) are respectively fed into the spinneret nozzle tip (A). Here, P is the pressure that is applied on the solutions, and Patm is the atmospheric pressure which equals 1 atm. FIG. 4 further depicts the spinneret tip and the multilayers nozzle index (412) with chambers 414 configured such that hollow fibre (410) is produced.

Plate-and-frame Membrane Module Design for Direct Contact Membrane Distillation

In our earlier patents (Qtaishat et al. 2012a,b), it was stated that the composite membranes performance improvement as a result of increasing the thermal conductivity of the bottom hydrophilic layer is realized when the boundary layers resistances are diminished. In the present disclosure, there is provided a plate-and-frame membrane module design for testing the flat-sheet composite polymeric and mixed matrix membranes by direct contact membrane distillation as shown in FIG. 5).

Figure 5:
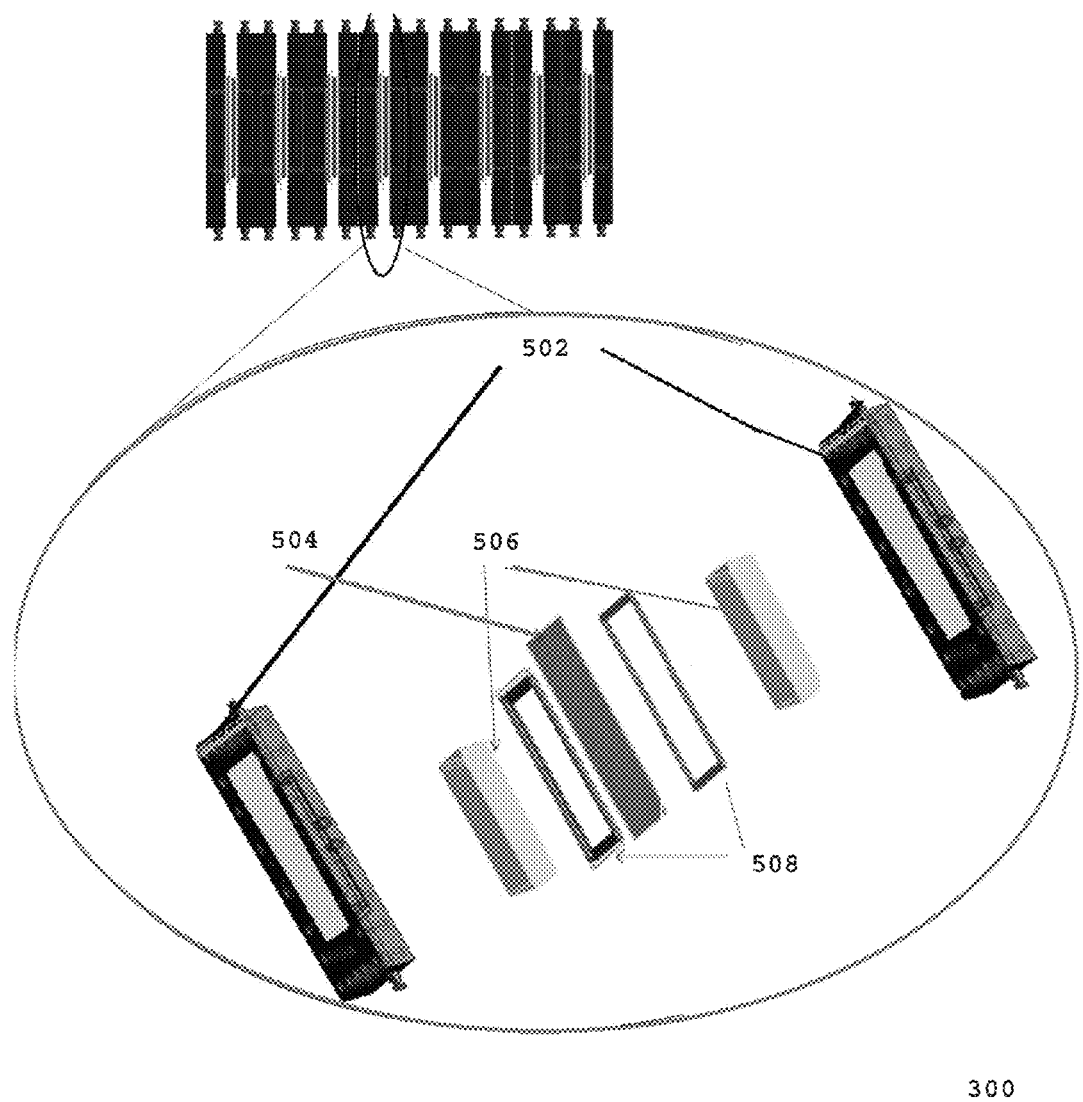
FIG. 5 graphically depicts a plate-and-frame membrane module design for direct contact membrane distillation according to a non-limiting embodiment.

FIG. 5 depicts wherein a plate-and-frame membrane module design for direct contact membrane distillation is configured wherein in between every two membrane holders (502) a membrane (504) is held between two tortuous surfaces (506) supported by a rubber O ring (508) on each side thereon. The tortuous surfaces (506) are configured such that the surface area of each face is maximized. The design comprises multi membrane bags that comprises feed and permeate inlet collectors to distribute the process solutions throughout the module consistently as shown in FIG. 6), the design comprises tortuous path channels that act as turbulence promoters.

The process solutions include the liquids contained within the feed tank and the permeate tank respectively. Here, the process solution could be (1) a feed solution which may be, e.g. sea water, brackish water, waste water, etc. and (2) a permeate solution which may be distilled water, tap water, deionized water, etc.

Figure 6:
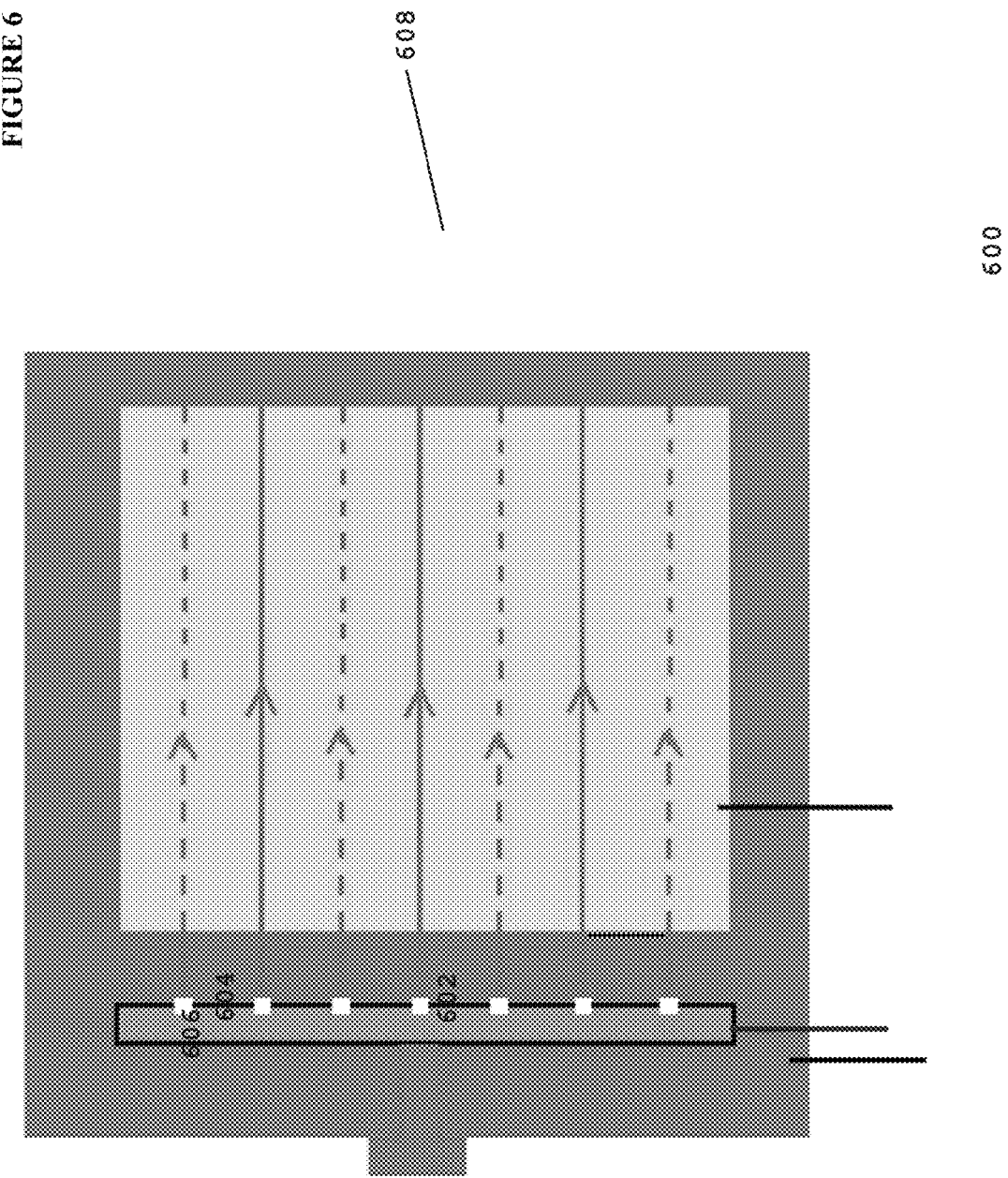
FIG. 6 graphically depicts the flow hydrodynamics inside the plate-and-frame membrane module.

FIG. 6 graphically illustrates the flow hydrodynamics inside the plate-and-frame membrane module wherein the hydrodynamic flow (608) traverses the tortuous surface (602) originating from the collector (604) contained on the holder (606). The design comprises wide open channels at the feed and permeate outlets to avoid fluid stagnation in the feed and permeate flow channels.

Application of the Preparation Techniques and the Plate-and-frame Module:

The preparation techniques described in the present disclosure are particularly useful in preparing multilayer composite polymeric and mixed matrix membranes. The plate-and-frame membrane module of the present disclosure is particularly useful for direct contact membrane distillation (DCMD).

The proposed techniques can produce membranes for wide range of application including, but not limited to, seawater desalination, wastewater treatment, food processing, concentration of pharmaceutical products, etc.

To gain a better understanding of the non-limiting embodiments described herein, the following example are set forth. It should be understood that this examples are for illustrative purposes only. Therefore, it should not limit the scope of this present disclosure in any way.

Example: Novel Mixed Matrix Membranes and a Device for Sea Water Desalination by Direct Contact Membrane Distillation It is well known that the relatively lower flux of MD compared to the well-established separation processes and the uncertainty of membrane durability due to the membrane pore wetting phenomenon are the major obstacles facing MD process from being commercialized for large scale industry. In our latest patents (Qtaishat et al. 2012 a,b), the concept of composite polymeric and mixed matrix membranes were presented to resolve the ever pending MD process obstacles. However, the manufacturing techniques described there (Qtaishat et al. 2012 a,b) are not flexible to scaling up for mass production of the membranes.

In the present disclosure, new techniques were proposed to manufacturing the membranes which allow ease of scaling up and better control on the membrane layers characteristics. Moreover, the provided plate-and-frame module in this disclosure is designed in such a manner that very high heat transfer coefficients in both feed and permeate boundary layers.

In this example, Different flat-sheet composite mixed matrix membranes were prepared using the doctor knife/slot die casting system described in FIG. 1, the membranes were made different hydrophilic polymer types and concentrations.

The morphology of the prepared composite mixed matrix membranes was studied using scanning electronic microscopy (SEM). The sea water desalination performance of the prepared membranes was tested by DCMD using the developed module device disclosed herein. The desalination performance was finally compared to that described in our earlier patents (Qtaishat et al. 2012a,b)

Experimental

Materials of the Hydrophilic Dope Solution (the Bottom Layer)

All chemicals used in preparing the hydrophilic dope solution are summarized in table 1 together with their chemical abstract service (CAS). The weight average molecular weight ($M_w$) of the polyetherimide (PEI) and the polyethersulfone used in this example are 15 and 30.8 kDa, respectively.

TABLE 1

Materials Used in this Example

| Material description | CAS number | Source |
|---|---|---|
| 1-Methyl-2-pyrrolidinone (NMP, anhydrous 99.5%) | 112-14-1 | Sigma-Aldrich, Inc., St. Louis, MO, USA |
| γ-Butyrolactone (GBL, 99+%) | 96-48-0 | Aldrich Chemical Company, Inc., Milwaukee, WI, USA |
| Boron nitride (powder, ~1 μm, 98%) | 246-140-8 | Aldrich Chemical Company, Inc., Germany |
| Polyetherimide (PEI, Ultem 1000, Natural Pallet) Specific gravity: 1.27 | 61128-46-9 | General Electric Co., Pittsfield, MA, USA |
| Polyethersulfone (PES, Radel A-300PNT) | 25667-42-9 | Amoco Polymer Inc., Alpharetta, Georgia, USA |

Materials of the Hydrophobic Dope Solution (the Top Layer)

Figure 7:
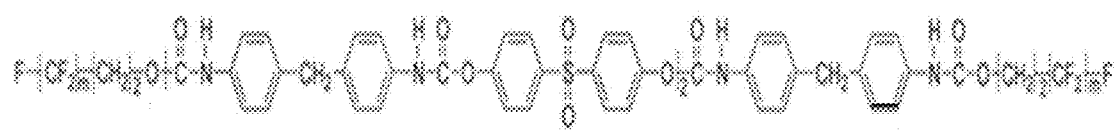
FIG. 7 shows the chemical structure of the hydrophobic SMMs polymer.

The hydrophobic material used in this dope solution is the surface modifying macromolecules developed in our earlier patents (Qtaishat et al. 2012a,b). The selected hydrophobic SMM polymer chemical structure is shown in FIG. 7.

Polymer Dope Solutions Preparation

The hydrophilic dope solution was prepared by dissolving a predetermined amount of PES or PEI in a NMP/GBL mixture. The resulting mixtures were stirred in an orbital shaker at room temperature for at least 48 h, and then 5 wt % of Boron nitride inorganic nano-particles were added to the polymer solution, and the solution was further stirred for 24 hours. The resulting solution is polymer-inorganic dispersion where the inorganic nano-particles are suspended. The PES and PEI concentration in the solution was 12 and 10 wt %, respectively. The GBL concentration was 10 wt %.

On the other hand the hydrophobic dope solution was prepared by dissolving 3 wt % of SMMs in a NMP/GBL mixture. The GBL concentration was 10 wt %. The resulting mixtures were stirred in an orbital shaker at room temperature for at least 72 h.

Finally, when the solutions are ready they were filtered using Teflon papers and then degassed at room temperature.

Membrane Preparation

The composite mixed matrix membranes were prepared by the phase inversion method. The hydrophilic dope solutions were cast on a support, wherein the support is a non-woven paper of a thickness of 0.20 mm using a doctor knife then the slot die coat a thin film of the hydrophobic dope solution as shown in FIG. 1). Then, the cast films together with the glass plates were immersed in tap water at room temperature. All the membranes were then dried at ambient conditions. Two different membranes, namely M1 and M2, were manufactured following this technique. In M1 membrane the base hydrophilic polymer was PEI, while M2 membrane base hydrophilic polymer was PES.

Membrane Characterization by Scanning Electronic Microscopy (SEM)

The cross-section and the top surface of the manufactured membranes were analyzed by scanning electron microscopy, SEM, (JSM-6400 JEOL, Japan). For the cross-section image, the membranes were cut into pieces (3 mm width and 10 mm length) and subsequently immersed in liquid nitrogen reservoir for 5 s. While keeping the pieces in the liquid nitrogen, those were broken into two pieces by pulling from both ends. One of the broken pieces was mounted on metal plate with carbon paste and gold-coated prior to use. The cross-section of the membranes at the broken parts was finally examined by SEM.

Sea Water Desalination Experiments by DCMD

Figure 8:
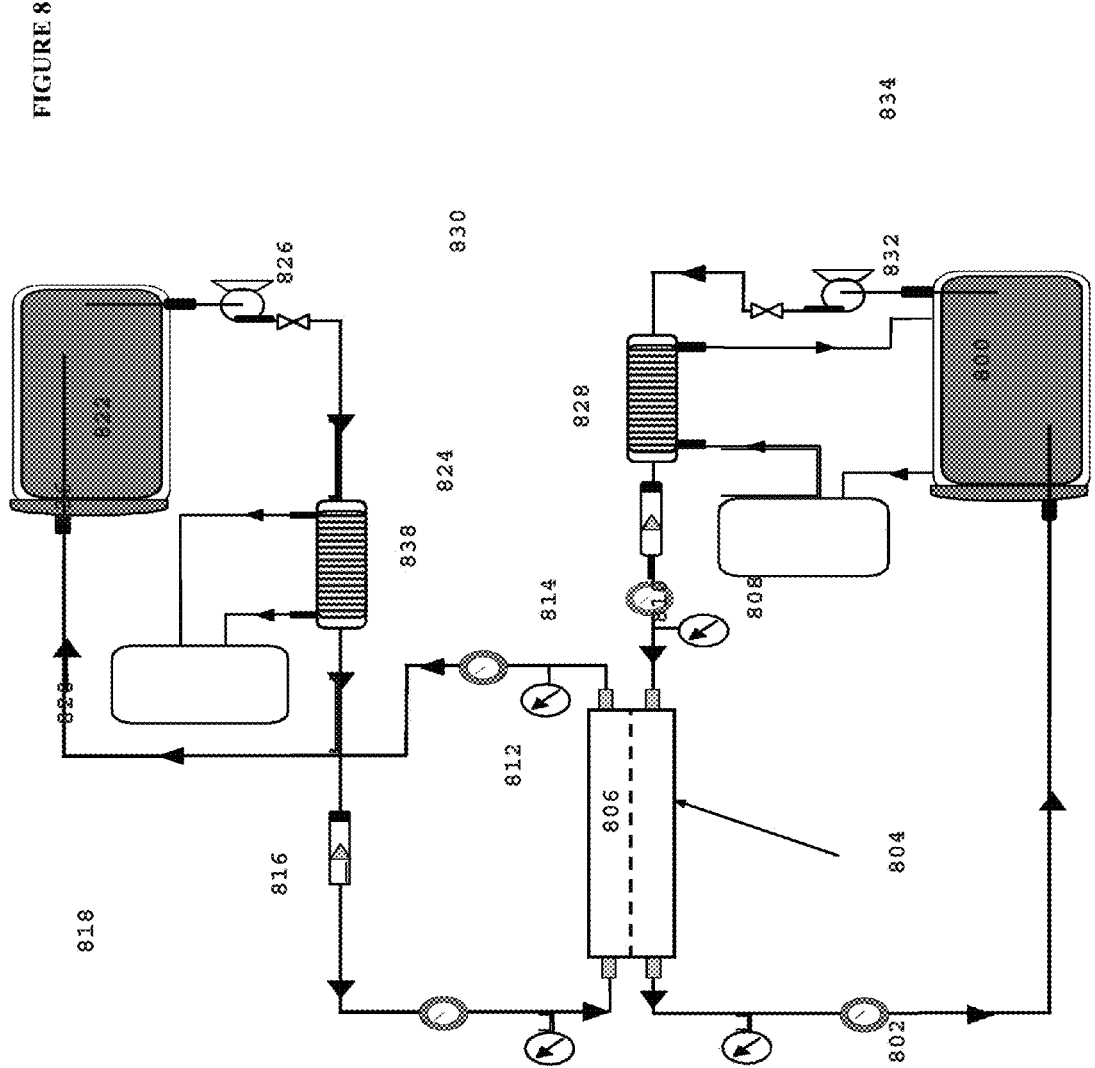
FIG. 8 is schematic diagram of the DCMD setup according to a non-limiting embodiment.

The system used to conduct DCMD experiments is presented in FIG. 8. It must be noted that several membrane modules can also be associated simultaneously in this system. In this example, the newly designed plate-and-frame membrane module that comprises 8 membrane bags was used allowing a total effective membrane area of 1 $m^2$.

As shown in FIG. 8, the hot feed sea water, contained in the feed tank (802), and the cold permeate tap water, contained in the permeate tank (834), are circulated tangentially to the membrane housed in the membrane module (816), by means of circulating pumps, including feed pump (804) and permeate pump (832) (March TE-5.5CMD) in counter-current flow. The temperatures of the feed and permeate solutions are measured at the inlets (822) and (814), and at the outlets (824) and (818), of the membrane module (816). These temperatures are measured continuously, in steady state, with Pt100 probes connected to a digital multimeter (Keithley 199), with an accuracy of ±0.1° C. The inlet temperature of the feed solution (814) is controlled by means of a thermostat (806) (Lauda K20KS) connected to a heat exchanger (808) located between the feed pump (804) and the membrane module (816). The tap water temperature is kept at about 25° C., which is controlled by a chiller (828) (PolyScience Model 675), the feed and permeate flow rates are measured with flowmeters (810), (826) (Tecfluid TCP 316-0630, with precision±2%). The pressure is controlled continuously with two manometers (812), (836) placed at the inlets and two manometers placed at the outlets (820), (838) of the membrane module (816). The DCMD flux is then measured in the cold side with the help of a graduated tube connected to the container and also by comparing the total volume of water lost in the feed container (802) with the volume of the permeate collected at the end of each experimental run. The effects of the feed temperature and feed and permeate flow rates can be investigated with this system. The absence of membrane wetting can be checked by measuring the electrical conductivity using conductivity meter 712 ΩMetrohm with a precision of ±1%. The separation factor, α, is calculated using the following expression:

$$\alpha = \left(1 - \frac{C_p}{C_f}\right)100$$

where $C_p$ and $C_f$ are the salt concentration in the permeate and in the bulk feed solution, respectively. The whole system is entirely insulated in order to minimize the heat lost to the surroundings.

This DCMD system may be applied for single DCMD module or for an array of DCMD modules.

Results and Discussion

Flat-Sheet Composite Mixed Matrix Membranes Characterization

Figure 9:
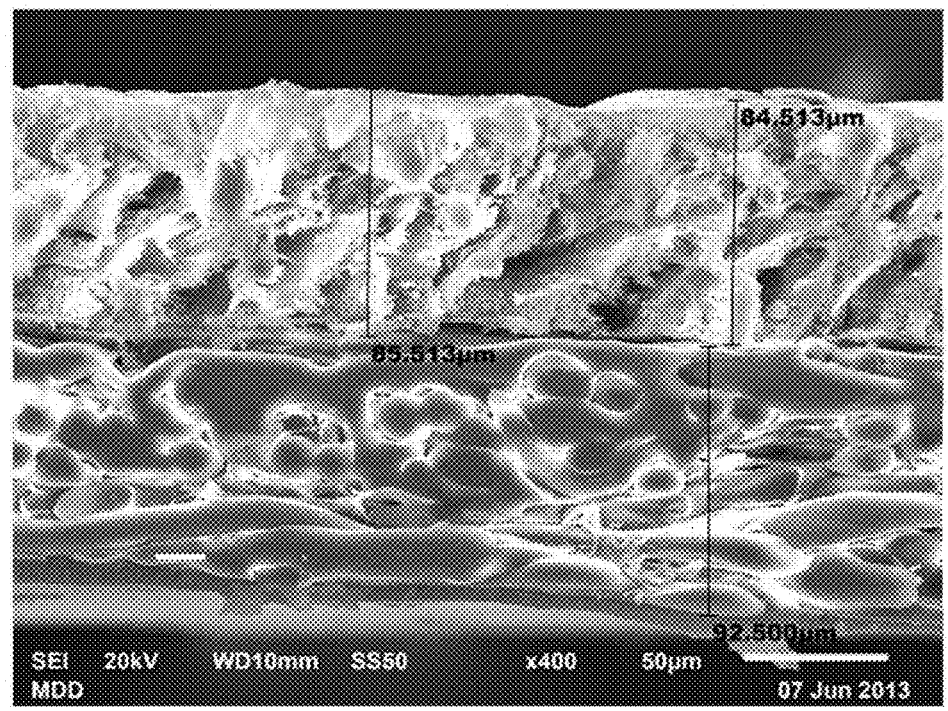
FIG. 9 depicts SEM pictures of the cross-section and the top surface of M2 membrane: (a) and (b), respectively.
Figure 9:
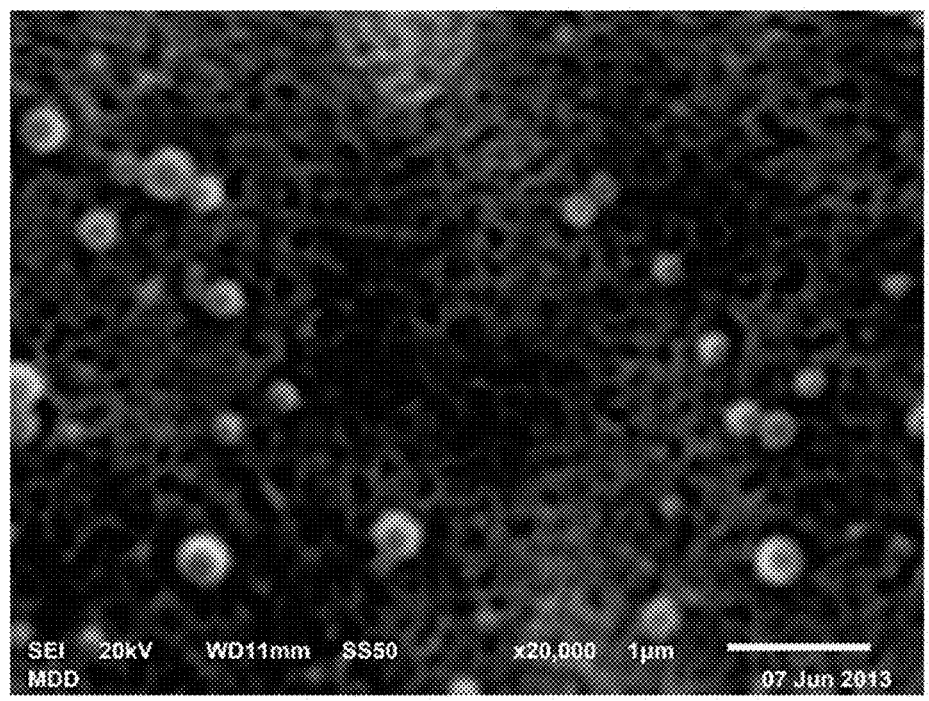

The SEM images of cross-section and the top surface of M2 membrane are shown in FIG. 9. As can be seen in FIG. 9a, the membranes are of asymmetric structure with a denser structure at the top surface, whereas the structure of the bottom surface exhibited an irregular finger-like structure and small macro-voids were formed at the bottom. Most importantly, it is also shown in FIG. 9a that the membrane total thickness was 85.5 µm, in which 84.5 µm is the thickness of the bottom hydrophilic layer and that of the top hydrophobic layer is around 1 µm. FIG. 9b shows the SEM image of the M2 membrane top surface, as can be shown the membrane is very porous with a very small pore size which is in agreement with the desired top layer characteristics considering the small layer thickness as shown in FIG. 9a.

Membrane Performance in Sea Water Desalination

Figure 10:
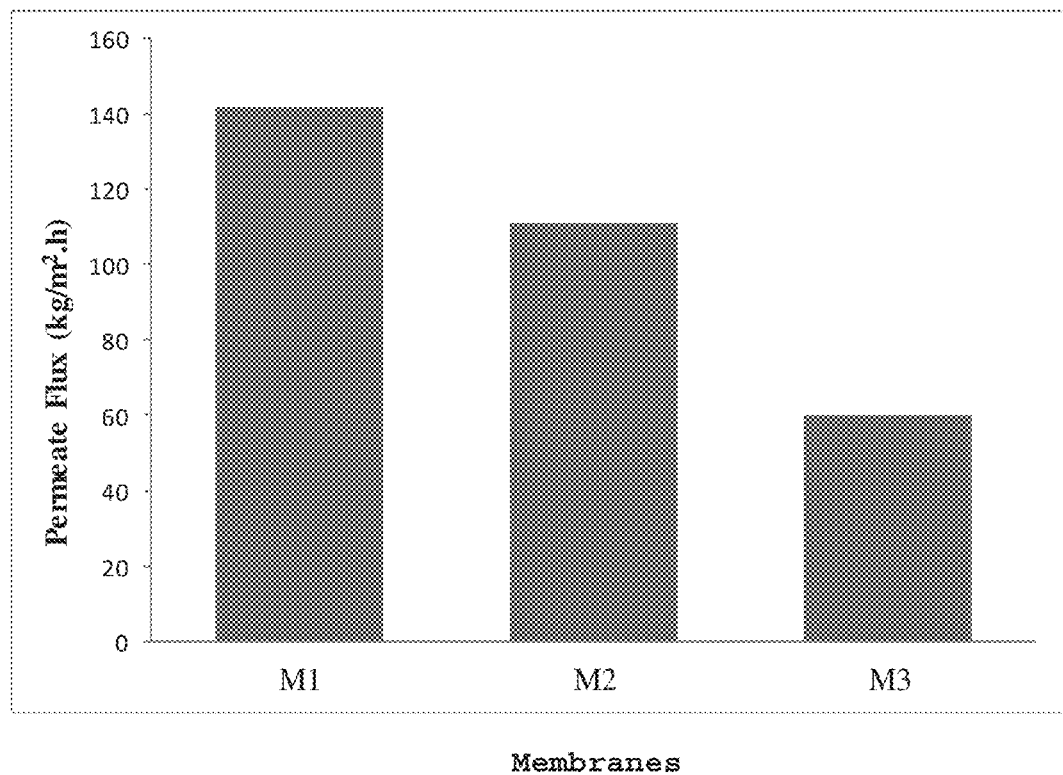
FIG. 10 graphically depicts a comparison in the sea water desalination performance between the membrane manufactured by the non-limiting embodiments (M1 and M2) and a membrane (M3) manufactured by the technique described in (Qtaishat et al. 2012b). The feed temperature is 65° C. and the permeate temperature is 25° C. and the process solutions flowrates are 3 L/min.

The sea water desalination performance of the manufactured flat-sheet composite mixed matrix membranes in this example (i.e. M1 and M2) is compared to one of the membranes (M3) that were manufactured earlier according to the methods described in our earlier patent (Qtaishat et al. 2012b). FIG. 10 shows this comparison, it is worth mentioning that the hydrophilic base polymer and the inorganic nanoparticles used in making M3 membrane are similar to those of M2 membrane of this example. It is clearly shown that the fluxes of both M1 and M2 membranes were unexpectedly superior to that of M3 membrane (more than the double), since they exhibited much thinner and more porous hydrophobic top layer than M3 membrane.

Figure 11:
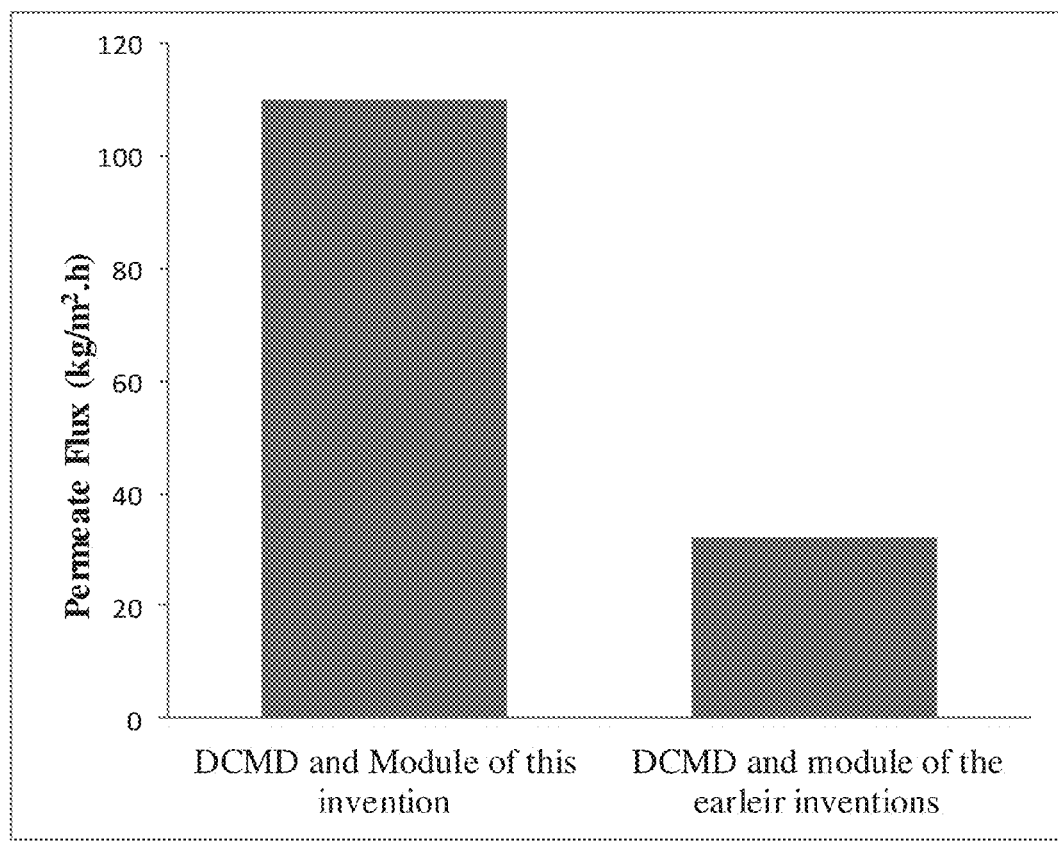
FIG. 11 graphically depicts a comparison in the sea water desalination performance of M3 membrane using the DCMD setup and membrane module presented in the non-limiting embodiments, and the DCMD system described in (Qtaishat et al. 2012b). The feed temperature is 65° C. and the permeate temperature is 25° C. and the process solutions flowrates are 3 L/min.

Furthermore, the performance of the DCMD setup and the membrane module disclosed herein (see FIGS. 5 and 8) was verified by testing M3 membrane, then the performance is compared to the same membrane flux when the DCMD setup described in (Qtaishat et al. 2012a,b) is used. This comparison is plotted in FIG. 11, in which it is clear that the same membrane performance was unexpectedly and surprisingly highly boosted using the DCMD module that is disclosed herein, since it offers improved flow hydrodynamics and avoids liquid stagnation in the feed and permeate flow channels.

It is worth mentioning that for all the DCMD experiments, the sea water temperature was 65° C., the permeate temperature was 25° C., and the feed and permeate flowrates were 3 L/min. Furthermore, all tested membranes exhibit salt rejection factors higher than 99.9%.

CONCLUSIONS

This example provides manufacturing techniques that can give the membrane manufacturer the capability of manufacturing membranes with the most desired characteristics.

The prepared membranes in this patent exhibited better membrane layers characteristics compared to those membranes prepared with other techniques including smaller top layer thickness and high porosity.

Furthermore, it was practically verified that the membrane module and the DCMD setup are crucial in improving the flow hydrodynamics, consequently the flux.

Without further analysis, the foregoing will so fully reveal the teachings of the present invention that others can by applying current knowledge without undue experimentation can readily adapt it for various applications outside of the embodiments described in detail herein.

In other words, while one or more exemplary embodiments have been described with reference to the figures, it will be understood by those of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the exemplary embodiments is defined not by the detailed description but by the appended claims, and all differences within the scope will be construed as being included in the inventive concept.

What is claimed is:

1. A method of manufacturing a multilayer polymeric and mixed matrix membrane comprising:
   providing a support layer;
   casting a hydrophilic layer on a surface of the support layer;
   casting a hydrophobic layer on the hydrophilic layer; and
   allowing the layers to form a multilayer polymeric and mixed matrix membrane
   wherein the hydrophilic layer comprises a hydrophilic polymer selected from the group consisting of polysulfone, polyether sulfone, polyetherimide, polyamide, cellulose acetate, and thermoplastics
   wherein the hydrophilic layer further comprises an inorganic nanoparticle having high thermal conductivity selected from the group consisting of copper oxide, boron nitride, aluminum nitride, aluminum, iron, silicon carbide, and a metal or metal oxides; and
   wherein the hydrophobic layer comprises a hydrophobic polymer selected from the group consisting of polypropylene, polytetraflouroethylene, and polyvinylidene fluoride; and
   wherein the hydrophobic layer further comprises a fluorinated hydrophobic surface modifying macromolecule selected from a group consisting of poly(urethane propylene glycol), poly(urethane diphenylsulfone), and poly(urea dimethylisiloxane urethane).

2. The method according to claim 1, further comprising immersing said multilayer mixed matrix membrane in water to allow for gelation.

3. The method according to claim 1, wherein the hydrophilic layer further comprises a non-solvent additive selected from a group consisting of γ-butyrolactone and ethanol.

4. The method according to claim 1,
   wherein the hydrophobic polymer dope solution has a lower viscosity and density than the hydrophilic polymer dope solution on the previously cast hydrophilic film.

5. A method of manufacturing a hollow fiber composite polymeric and mixed matrix membrane comprising:
   providing a first solution having a hydrophilic polymer;
   providing a second solution having a hydrophobic polymer; and
   extruding the first and second solutions to form a multilayer hollow fiber composite polymeric and mixed matrix membrane
   wherein the first solution comprises a hydrophilic polymer selected from the group consisting of polysulfone, polyether sulfone, polyetherimide, polyamide, cellulose acetate, and thermoplastics
   wherein the first solution further comprises an inorganic nanoparticle having high thermal conductivity selected from the group consisting of copper oxide, boron nitride, aluminum nitride, aluminum, iron, silicon carbide, and a metal; and wherein the hydrophobic layer comprises a hydrophobic polymer selected from the group consisting of polypropylene, polytetrafluoroethylene, and polyvinyledene fluoride; and the hydrophobic polymer further comprises a fluorinated hydrophobic surface modifying macromolecule selection of a group consisting of poly (urethane propylene glycol), poly (urethane diphenylsulfone), and poly (urea dimethylsiloxane urethane).

6. The method according to claim 5, wherein the first solution in extruded as an outer layer.

7. The method according to claim 5, wherein the first solution in extruded as an inner layer.

8. The method according to claim 5, wherein the first solution further comprises a non-solvent additive selected from a group consisting of γ-butyrolactone and ethanol.

9. A plate-and-frame membrane module for direct contact membrane distillation using a multilayer polymeric or mixed matrix membrane, the plate-and-frame membrane module comprising:
   a feed inlet capable of distributing process solution throughout the membrane module;
   a permeate inlet capable of distributing process solution throughout the membrane module;
   a tortuous promoter comprising multiple flow channels;
   a feed outlet; and
   a permeate outlet,
   wherein the mixed matrix membrane comprises a hydrophilic layer having a hydrophilic polymer selected from the group consisting of polysulfone, polyether sulfone, polyetherimide, polyamide, cellulose acetate, and thermoplastics
   wherein the hydrophilic layer further comprises an inorganic nanoparticle having high thermal conductivity selected from the group consisting of copper oxide, boron nitride, aluminum nitride, aluminum, iron, silicon carbide, and a metal or metal oxides; and
   wherein the hydrophobic layer comprises a hydrophobic polymer selected from the group consisting of polypropylene, polytetrafluoroethylene, and polyvinyledene fluoride; and the hydrophobic polymer further comprises a fluorinated hydrophobic surface modifying macromolecule selection of a group consisting of poly (urethane propylene glycol), poly (urethane diphenylsulfone), and poly (urea dimethylsiloxane urethane).

10. The membrane module of claim 9, wherein the matrix membrane is configured as a hollow fibre membrane or a flat sheet membrane.

11. The membrane module according to claim 9, wherein the flow regimes of the feed and permeate flow solutions during direct contact membrane distillation is a turbulent regime.

12. The membrane module according to claim 9, wherein the feed and permeate flow channels are configured such that there is no liquid stagnation in the flow channels.

13. The membrane module according to claim 9, configured for direct contact membrane distillation wherein seawater desalination flux is up to 142 kg/m$^2$h.

14. An array comprising multiple plate-and-frame membrane modules according to claim 9.

* * * * *